US009422388B2

(12) United States Patent
Eichelmann et al.

(10) Patent No.: US 9,422,388 B2
(45) Date of Patent: Aug. 23, 2016

(54) PU COMPOSITIONS CONTAINING COMPLEXED CATALYSTS

(71) Applicant: Henkel AG & Co. KGaA, Duesseldorf (DE)

(72) Inventors: Holger Eichelmann, Hilden (DE); Christoph Loschen, Erkrath (DE); Andre te Poel, Willich (DE); Marcel Blodau, Krefeld (DE); Natalie Steinhausen, Essen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 25 days.

(21) Appl. No.: 13/799,044

(22) Filed: Mar. 13, 2013

(65) Prior Publication Data
US 2013/0190447 A1 Jul. 25, 2013

Related U.S. Application Data

(63) Continuation of application No. PCT/EP2012/056128, filed on Apr. 4, 2012.

(30) Foreign Application Priority Data

Apr. 15, 2011 (DE) ........................ 10 2011 007 504

(51) Int. Cl.
| C08K 5/00 | (2006.01) |
| C08G 18/06 | (2006.01) |
| C08G 18/16 | (2006.01) |
| C08G 18/22 | (2006.01) |
| C08G 18/08 | (2006.01) |
| C08G 18/24 | (2006.01) |
| C09J 175/04 | (2006.01) |
| C09J 175/06 | (2006.01) |
| C08G 18/66 | (2006.01) |
| C08G 18/76 | (2006.01) |
| C08G 18/79 | (2006.01) |
| C08G 18/12 | (2006.01) |
| C08G 18/36 | (2006.01) |

(52) U.S. Cl.
CPC ............. *C08G 18/06* (2013.01); *C08G 18/089* (2013.01); *C08G 18/12* (2013.01); *C08G 18/16* (2013.01); *C08G 18/22* (2013.01); *C08G 18/24* (2013.01); *C08G 18/36* (2013.01); *C08G 18/6644* (2013.01); *C08G 18/7664* (2013.01); *C08G 18/7671* (2013.01); *C08G 18/792* (2013.01); *C09J 175/04* (2013.01); *C09J 175/06* (2013.01)

(58) Field of Classification Search
CPC .... C08G 16/06; C08G 18/00; C08G 18/022; C08G 18/16; C08G 18/24; C08G 18/26; C08G 18/222; C08G 18/5048; C08G 18/10; C08G 18/166
USPC ........................................................ 524/284
See application file for complete search history.

(56) References Cited

U.S. PATENT DOCUMENTS

| 2,866,774 | A |   | 12/1958 | Price |
| 2,986,553 | A | * | 5/1961  | McCulloch .................... 528/65 |
| 3,635,906 | A | * | 1/1972  | Jayawant ........................ 528/58 |
| 3,895,149 | A |   | 7/1975  | Sheffler et al. |
| 4,322,327 | A |   | 3/1982  | Yoshimura et al. |
| 4,395,528 | A |   | 7/1983  | Leiner et al. |
| 4,426,510 | A |   | 1/1984  | DelDonno |
| 4,474,836 | A |   | 10/1984 | Lukoscheck et al. |
| 4,611,044 | A |   | 9/1986  | Meyer et al. |
| 4,788,083 | A |   | 11/1988 | Dammann et al. |
| 4,871,854 | A |   | 10/1989 | Oberth et al. |
| 5,318,998 | A | * | 6/1994  | Taguchi et al. ................ 522/24 |
| 5,474,827 | A |   | 12/1995 | Crandall et al. |
| 6,084,026 | A |   | 7/2000  | Jamasbi |
| 6,124,380 | A |   | 9/2000  | Bossert et al. |
| 6,503,995 | B2 |  | 1/2003  | Tsuji et al. |
| 6,548,615 | B1 |  | 4/2003  | Groth et al. |
| 6,914,110 | B2 |  | 7/2005  | Tsuji et al. |
| 7,351,782 | B2 |  | 4/2008  | Wakabayashi et al. |
| 7,550,547 | B2 |  | 6/2009  | Wakabayashi et al. |
| 7,807,756 | B2 |  | 10/2010 | Wakabayashi et al. |
| 7,834,123 | B2 |  | 11/2010 | Suen |
| 7,910,682 | B2 |  | 3/2011  | Okamoto et al. |
| 7,998,919 | B2 |  | 8/2011  | Rong et al. |
| 2002/0115770 | A1 | | 8/2002 | Georgeau et al. |
| 2005/0171315 | A1 | | 8/2005 | Wakabayashi et al. |

(Continued)

FOREIGN PATENT DOCUMENTS

| DE | 1956672 | 6/1970 |
| DE | 108103 | 9/1974 |

(Continued)

OTHER PUBLICATIONS

International Search Report issued in connection with International Patent Application No. PCT/EP2012/056128 mailed on Sep. 25, 2012.
EN ISO 2555, Jan. 2000.
International Search Report issued in connection with International Patent Application No. PCT/EP2010/066349 mailed Jun. 8, 2011.
Database Registry [Online] Chemical Abstracts Service, Columbus, Ohio, US, Nov. 16, 1984 "Tinuvin 327", XP002629922.

(Continued)

*Primary Examiner* — Jane L Stanley
(74) *Attorney, Agent, or Firm* — James E. Piotrowski

(57) ABSTRACT

The invention relates to a crosslinkable composition containing reactive polymers selected from among (i) prepolymers having reactive NCO groups or (ii) polymers which have reactive silane groups, optionally further additives and at least one metal-based catalyst, wherein the composition contains up to 10% by weight of retarding substance selected from among cyclic α-hydroxy ketones and/or triphenols having three adjacent OH groups.

12 Claims, No Drawings

(56) References Cited

U.S. PATENT DOCUMENTS

| | | |
|---|---|---|
| 2006/0018027 A1 | 1/2006 | Yamasaki |
| 2006/0047063 A1 | 3/2006 | Schaub et al. |
| 2006/0051572 A1 | 3/2006 | Suzuki et al. |
| 2006/0069225 A1 | 3/2006 | Wintermantel et al. |
| 2006/0180274 A1 | 8/2006 | Burckhardt et al. |
| 2006/0252856 A1 | 11/2006 | Anderson et al. |
| 2006/0287408 A1 | 12/2006 | Baikerikar et al. |
| 2007/0117888 A1 | 5/2007 | Anderson et al. |
| 2007/0270567 A1 | 11/2007 | Suen |
| 2008/0009914 A1 | 1/2008 | Buysman et al. |
| 2008/0099141 A1* | 5/2008 | Booth et al. ............... 156/331.7 |
| 2009/0145067 A1 | 6/2009 | Tatley et al. |
| 2009/0247720 A1 | 10/2009 | Wang et al. |
| 2010/0041810 A1 | 2/2010 | Wakabayashi et al. |
| 2012/0258306 A1 | 10/2012 | Kinzelmann et al. |
| 2013/0078473 A1 | 3/2013 | Kollbach |

FOREIGN PATENT DOCUMENTS

| | | |
|---|---|---|
| DE | 3709631 | 10/1987 |
| DE | 2760420 | 6/1989 |
| DE | 4444249 | 6/1996 |
| DE | 19840318 | 3/2000 |
| DE | 80125268 | 10/2007 |
| EP | 549210 | 6/1993 |
| EP | 520426 | 4/1996 |
| EP | 1288247 | 3/2003 |
| EP | 1591488 | 11/2005 |
| EP | 1857480 | 11/2007 |
| JP | S5984951 A | 5/1984 |
| JP | S62236816 A | 10/1987 |
| JP | H10338769 A | 12/1998 |
| JP | 2001172566 A | 6/2001 |
| JP | 2004197054 A | 7/2004 |
| JP | 2008120884 A | 5/2008 |
| JP | 2009102644 A | 5/2009 |
| JP | 2013507459 A | 3/2013 |
| WO | 0238688 A2 | 5/2002 |

OTHER PUBLICATIONS

Database Registry [Online] Chemical Abstracts Service, Columbus, Ohio, US, Nov. 16, 1984 "Tinuvin 328", XP002629923.

Database Registry [Online] Chemical Abstracts Service, Columbus, Ohio, US, Nov. 16, 1984 "U-220", XP002629924.

International Search Report issued in connection with International Patent Application No. PCT/US2011/035454 mailed Feb. 8, 2012.

Li L. and Xu B: Synthesis and characterization of 5-substituted 8-hydroxyquinoline derivatives and their metal complexes, tetrahedron 64, pp. 10986-10995 (2008).

\* cited by examiner

PU COMPOSITIONS CONTAINING COMPLEXED CATALYSTS

The invention relates to crosslinking compositions that comprise metal catalysts with selected ligands. In this regard the catalysts display a retarded reactivity in the catalysis of PU compositions.

EP 1857480 describes 2-component adhesives that comprise Sn catalysts and blocking agents. Here, hydroxyquinoline compounds are described as the blocking agents. US 2006/0180274 describes 1K-PU systems with Bi catalysts that additionally comprise aromatic nitrogen-containing compounds.

US 6084026 describes crosslinking systems that comprise isocyanates and polyol compounds, wherein carboxylic acids or sulfonic acids have to be additionally comprised as well as substances of the classes N-containing rings, β-dicarbonyl compounds or α-hydroxy compounds. Cyclic α-hydroxy ketones are not described.

US 2008/0099141 describes the adhesive bonding of laminates with PU adhesives, wherein a metal catalyst is added as well as a blocking agent. The latter is described as a 1,2-diphenol compound or as a mercapto compound.

DE 198 40 318 describes reactive compounds of isocyanate-containing prepolymers and polyols. These comprise a combination of catalysts, wherein the catalyst is a reaction product of organotin or organobismuth compounds, of a thiol-containing compound or a reactive polyphenol with neighboring hydroxyl groups in the presence of a tertiary amine and a hydrolysable halogen compound.

DE 44 44 249 describes a catalyst composition for manufacturing polyurethanes that comprise at least one tertiary amine and at least one organic acid. In this regard, benzoic acid is added as the organic acid which additionally comprises at least one additional NCO-reactive group attached to the aromatic ring. Tin catalysts are not described.

DE 37 09 631 describes an activatable catalyst for the reaction of a hydroxyl compound with an isocyanate compound. The activatable catalyst functions in the presence of an amine activator, contains a tin or a bismuth catalyst and a molar excess of a complexant. Mercapto compounds or reactive polyphenols in the presence of tertiary amines were described as the complexant. Inter alia, α-hydroxy ketones are also additionally described. The use of α-hydroxy ketones alone is not described.

It is known that polyurethane crosslinking reactions as the reaction of isocyanate with water or as the reaction of isocyanate with OH components are accelerated by metal or amine catalysts. In this regard, it is frequently desired to achieve a reaction that is as rapid as possible. On the other hand, catalysts are known that exhibit only a slow reactivity. This allows a longer processing time for the materials, the compositions applied as an adhesive or sealant can optionally also still be worked at the onset of curing. A disadvantage of such slow catalysts, however, is inevitably that the complete crosslinking of a corresponding composition also takes a long time. Such compositions can be further worked only after this final cure; the substrate should be fixed beforehand in order for the desired disposition to remain in place. These long reaction times are consequently disadvantageous for further processing.

Therefore, the object of the present invention is to make available catalyst compositions and crosslinkable polyurethane compositions which possess an induction phase, in which the catalytic reactivity is still reduced, but exhibit a high reactivity and catalytic activity after this induction phase, in order to produce a rapid crosslinking of the system to be crosslinked. In this regard, these catalyst systems should be suitable for crosslinking reactions based on polyurethanes, or however also be employable for crosslinking reactions involving crosslinking systems based on silane condensation. It is likewise a requirement that the catalysing compositions can be mixed into a 1K system or a 2K system and afford storage-stable compositions.

A subject matter of the invention is a crosslinkable composition comprising reactive polymers selected from (i) prepolymers that possess reactive NCO groups, or (ii) polymers that possess reactive silane groups, optional further additives, and at least one metal-based catalyst, wherein the composition comprises up to 10 wt % of a retarding substance, selected from cyclic α-hydroxy ketones and/or triphenols containing three neighboring OH groups.

Another subject matter of the invention is a catalyst composition based on compounds that contain metal atoms, selected from Sn, Ti, Zn, Pb, Bi, Fe, Co or Ni and a retarding substance as the ligands, selected from cyclic α-hydroxy keto 5-, 6- or 7-membered ring compounds and/or optionally substituted, 2,3,4- or 3,4,5-triphenols. Another subject matter of the invention is the use of such catalyst compositions for crosslinking polymer compositions that crosslink through the NCO/OH reaction or through SiOR condensation.

Compositions according to the invention are those that comprise at least one polymer that possesses NCO groups or silane groups. In this regard, it can concern polymers that comprise functional groups in the main chain, it can concern oligomers having the corresponding groups or can concern mixtures. Compositions according to the invention are also those that comprise monomeric or oligomeric polyisocyanates that crosslink with polymers that possess at least two NCO-reactive groups. The compositions can comprise still other components.

A composition according to the invention can be a 2-component composition that comprises NCO group-containing prepolymers or polyisocyanates as one component, and comprises at least one crosslinker as the second component that possesses at least two NCO group-reactive functional groups, together with other additives. Another composition according to the invention can be a 1-component composition that comprises an NCO-group-containing prepolymer, together with additional additives. Another composition according to the invention can be a composition that comprises an silane group-containing prepolymer, together with additional additives.

Furthermore, a metallic catalyst and at least one inventively required retardant substance is comprised in one component, for example cyclic α-hydroxy ketones, such as α-hydroxy keto 5-, 6- or 7-membered ring compounds and/or optionally substituted, 2,3,4- or 3,4,5-triphenol derivatives.

Exemplary polymers carrying NCO groups are polyurethane prepolymers with at least two isocyanate groups which are obtained for example by reacting a polyol component with an at least stoichiometric excess of difunctional isocyanate.

In the context of the present invention, PU prepolymers are reaction products of OH group- or NH group-carrying compounds with an excess of polyisocyanates. The polymers and polyisocyanates which can be employed in the synthesis of the PU prepolymers are known to the person skilled in the art. They concern the polyols or corresponding compounds with secondary and/or primary amino groups which are known for application in adhesives. Polyols with a molecular weight of up to 20000 g/mol (weight average molecular weight, $M_N$, as can be determined by GPC) are particularly suitable for the synthesis of these prepolymers. They can be for example polyols based on polyethers, polyesters, polyolefins, polyacrylates, alkylene polyols, or as other embodiments, analogous compounds with NH groups.

In this respect, the polyol component or the polyamine can be of low molecular weight, for example from ca. 60 g/mol to 1500 g/mol; however, higher molecular weight polymers can also be reacted, for example those with a molecular weight from 1500 to 20000 g/mol. It is also possible to react compounds that have a plurality of functional groups; preferably there should be an average of two reactive groups on the polymer. Starting compounds that contain OH groups are preferred, in particular diols.

In the prepolymer synthesis, the known polyisocyanates having two or more isocyanate groups can be added as the polyisocyanates. Suitable polyisocyanates are aromatic isocyanates, aliphatic or cycloaliphatic isocyanates. Examples are 1,5-naphthylene diisocyanate, 2,4- or 4,4'-diphenylmethane diisocyanate (MDI) and mixtures of the isomers, hydrogenated MDI (H12MDI), xylylene diisocyanate (XDI), tetramethylxylylene diisocyanate (TMXDI), di- and tetraalkylene diphenylmethane diisocyanate, 4,4'-dibenzyl diisocyanate, 1,3- or 1,4-phenylene diisocyanate, the isomers of toluoylene diisocyanate (TDI), 1-methyl-2,4-diisocyanato-cyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), phosphorus- or halogen-containing diisocyanates, tetramethoxybutane-1,4-diisocyanate, naphthaline-1,5-diisocyanate (NDI), butane-1,4-diisocyanate, hexane-1,6-diisocyanate (HDI), dicyclohexylmethane diisocyanate, cyclohexane-1,4-diisocyanate, ethylene diisocyanate, methylenetriphenyl triisocyanate (MIT), 1,4-diisocyanatobutane, 1,12-diisocyanatododecane, or dimer fatty acid diisocyanate. Polyfunctional isocyanates can also be added, such as those that result from trimerization or oligomerization of diisocyanates or from the reaction of diisocyanates with polyfunctional hydroxyl group- or amino group-containing compounds. Diisocyanates are preferably employed.

The reaction control can be influenced by the amount of the isocyanate. If a large excess of isocyanates is added, then PU prepolymers are formed in which the OH groups have been functionalized by isocyanate groups. Here, only a slight increase in molecular weight is observed. If lower amounts of isocyanates are added or if the reaction is carried out in stages, it is known that the molecular weight of the prepolymers is increased in comparison to the starting compounds. All in all it must be ensured in this case that an excess of isocyanate is added, based on the overall reaction.

The reaction of the polyol compound with the isocyanates can occur according to known methods. It is possible that unreacted isocyanates are present in the reaction mixture. Another procedure ensures by means of the type of reaction control that only minor amounts of monomeric, unreacted isocyanates remain in the mixture. In another procedure, unreacted diisocyanates are distilled off, such that particularly monomer-poor products can be produced.

The known PU prepolymers that have reactive NCO groups can be employed for the invention. They are known to the person skilled in the art and can also be obtained commercially. In the context of this invention, PU prepolymers, based on polyester polyols or polyether polyols reacted with diisocyanates, are particularly preferred. In the context of the present invention, suitable PU prepolymers generally have a molecular weight of 500 to about 30000 g/mol, preferably up to 15000 g/mol, in particular from 1000 to 5000 g/mol ($M_N$, number average molecular molecular weight, as determined by GPC against a polystyrene standard).

In the context of this invention, PU prepolymers should also be understood to include mixtures of prepolymers with other similar or different polyisocyanates. They can already be obtained in the production reaction of the prepolymers, but they can also be added later to the composition. Another embodiment as a 2K-NCO composition employs only polyisocyanates as the NCO reactive component which were not further reacted. The polyisocyanates can concern aliphatic, aromatic or polymeric isocyanates, which have already been listed above.

The suitable PU prepolymer or the polyisocyanates can comprise still other auxiliaries and additives. Care should be taken in this respect that only those ingredients are added that cannot react with the isocyanate groups.

The abovementioned prepolymers can be employed as a 1K-PU. They then crosslink with water or moisture. A preferred embodiment employs such prepolymers as a 2K-PU. It is then required, immediately before the application, to mix an additional component B to an inventive 2K-PU composition which crosslinks with the reactive prepolymer.

This component B must comprise at least one compound that possesses at least two groups that react with isocyanate groups. For example, they can be SH, COOH, NH or OH groups, polyols being particularly preferred, wherein mixtures of polyols of different chemical structure or different molecular weight can also be considered. These compounds act as crosslinkers.

Many polyols are suitable for use as the polyol component in the component B. For example, they can be those with two up to 100H groups per molecule. They can be aliphatic compounds, aromatic compounds, polymers can also be employed that carry an adequate number of OH groups. They can concern primary or secondary OH groups, in so far as there exists an adequate reactivity with the isocyanate groups.

Examples of such polyols are low molecular weight aliphatic or aromatic polyols with preferably two to ten OH groups, in particular with 2 to 36 carbon atoms. Examples of these are C2 to C24 polyols, such as ethylene glycol, propylene glycol, butane diol-14, hexane diol-16, octane diol-18, dimer fatty acid diols, diethylene glycol, triethylene glycol, dipropylene glycol, glycerin, trimethylolpropane, pentaerythritol or sugar alcohols; monocyclic polyols, such as resorcinol, pyrogallol, hydroquinone and their derivatives or other aromatic polyols.

Other groups of suitable polyol compounds are polymeric lactones or polyacetals, in so far as these possess at least two functional groups and an appropriate suitable molecular weight. OH-Functional poly(meth)acrylates are also suitable as polyol compounds. Such poly(meth)acrylates are obtainable for example by polymerizing ethylenically unsaturated monomers, wherein a number of the monomers additionally carry an OH group. Another group of polyols are OH group-containing polyurethanes. In this regard, the known polyurethanes can be manufactured as the reaction product of polyols with a less than stoichiometric amount of isocyanates.

Another group of suitable polyols are for example polyethers. Here, they concern the reaction products of alkylene oxides containing 2 to 4 carbon atoms with low molecular weight alcohols. Examples of such compounds are polypropylene glycol, polyethylene glycol, poly-THF.

Another suitable group of polyol compounds are polyester polyols. The polyester polyols known for adhesives can be employed. They concern for example the reaction products of diols, in particular low molecular weight alkylene diols or polyether diols with dicarboxylic acids. Here, they can be aliphatic, aromatic carboxylic acids or mixtures thereof. Optionally, esters of these carboxylic acids or anhydrides can also be reacted. The person skilled in the art is aware of such polyester polyols in many developments.

Another group of suitable polyols are polycarbonate polyols. They can be manufactured by reacting low molecular diols with sublimed cyclic carbonates. Such polyols are known to the person skilled in the art and are commercially available.

The molecular weight of the polyols can be from ca. 50 to about 20000 g/mol, in particular from 250 to 10000 g/mol. Such polyols are commercially available.

Another embodiment of the invention employs polymers, wherein the polymer comprises reactively incorporated —Si(OR)$_n$ with n=2 or 3. These silane crosslinking systems are storage stable in the absence of water. Polymers can be employed as the polymers which comprise silane crosslinking groups incorporated during manufacture or the silane crosslinking groups are subsequently reactively incorporated. Exemplary polymers can be polyurethanes, polyacrylates, polyolefins, polyethers, polyesters as a homopolymer or copolymer, as a statistical or block copolymer. Silane groups can be incorporated by copolymerization with silane-containing monomers or by subsequent functionalization with bifunctional silane-containing compounds that can be reacted with suitable groups of the polymer. The molecular weight ($M_N$) of such polymers can be up to 20000 g/mol. In particular they are liquid polymers. Appropriate silane-containing polymers are known and commercially available.

2K-Silane crosslinking systems are also known, wherein the second component can then likewise comprise silane prepolymers, but it is also possible to use low molecular weight silanes in the second component. Alternatively, a second component can also comprise water. In addition, these second components can additionally comprise the usual known additives and auxiliaries.

The 1K- or 2K-compositions according to the invention can further comprise auxiliaries. These should be inert towards the reactive groups of the polymer, thus should yield storage-stable compositions. These are understood to mean substances that are generally added so as to modify the properties of the significant components in the desired manner, e.g. their processability, shelf life and also to match application properties to the practical field of use. Examples of these are finely divided colorants, fillers, leveling agents, wetting agents, thixotropes, resins, anti-aging agents, stabilizers, light stabilizers, plasticizers, solvents and/or adhesion promoters.

Suitable fillers or pigments are inorganic compounds that are unreactive to isocyanates such as chalk, coated chalk, lime powder, calcium magnesium carbonates, aluminum oxides and aluminum hydroxides, precipitated silicic acid, zeolites, Bentonites, glass, hollow spheres, titanium dioxide, barium sulfate or other poorly soluble oxides, sulfates, carbonates of metals, in so far as they exist as a powder, i.e. with a particle size between 1 and 200 μm, in particular between 3 and 50 μm. After mixing, such fillers are dispersed in the composition.

The composition according to the invention can comprise tackifying resin as an additional ingredient. The resin affords an additional tackiness. Examples of these are aromatic, aliphatic or cycloaliphatic hydrocarbon resins, modified natural resins, colophonium, terpene resins, acrylic acid copolymers or styrene polymers.

Plasticizers can be comprised as an additional optional ingredient. They are used preferably to adjust the viscosity or the flexibility and should be highly compatible with the polymer. Exemplary suitable plasticizers are medicinal white oils, naphthenic mineral oils, paraffinic hydrocarbon oils, oligomers of polypropylene, of polybutene, of polyisoprene, oligomers of hydrogenated polyisoprene and/or of polybutadiene, benzoate esters, phthalates, adipates, polypropylene glycol or polybutylene glycol.

In addition, leveling agents, thixotropes, stabilizers and/or light stabilizers can be comprised. Such additives are known to the person skilled in the art for various application purposes. Solvents can be added, in so far as they are inert towards NCO groups.

A composition according to the invention must comprise a metallic catalyst. In this regard, this concerns compounds that have a metal atom together with organic groups. Exemplary metals are tin, titanium, zinc, lead, bismuth, iron, cobalt, nickel, calcium, barium, manganese, vanadium, zirconium, and/or aluminum. These can be present, for example, as a carboxylic acid salt, chelate, such as for example acetylacetonate, hydroxide, alcoholate, phenolate, oxide, mixed groups being also known in the metal catalyst.

They particularly concern compounds of Sn, Fe, Ti, Al, Bi or Zr as the carboxylic acid salt, oxide, hydroxide or acetylacetonate. The amount can range from 0.001 to 10 wt %, based on the total composition. Quantities of 0.01 to 5 wt %, particularly 0.01 to 3 wt %, are preferred.

Moreover, the composition must inventively comprise up to 10 wt % of at least one retarding substance. A retarding substance is understood to mean those compounds that together with a metallic catalyst initially allow the crosslinking reaction to proceed slowly, but with time the reaction rate becomes faster. It can be reacted with the catalyst as a chelate compound, it can be added with the catalyst as a mixed intermediate or it is added per se to the crosslinking composition. The retarding substance is selected from cyclic α-hydroxy ketones and/or triphenols with three neighboring OH groups. The α-hydroxy ketones can have various structures. They can be aliphatic or cycloaliphatic compounds for example; aromatic compounds with one or more annulated phenyl rings can also be employed. They can possess substituents on the backbone; it is also possible to employ substances with a plurality of groups of the same kind. Triphenols with three adjacent OH phenol groups can also be employed as another class of substances with the inventive effects. They can likewise carry substituents, such as alkyl substituents or aromatic rings.

The α-hydroxy ketones particularly concern cyclic 5-, 6- or 7-membered ring structures that possess a keto group and a neighboring α-OH group. Heteroatoms, for example O, N or S, can also be comprised in the ring. One or more optionally additionally substituted alkyl or aryl substituents can also be comprised. Unsaturated groups are also possible. Suitable classes of compounds can be represented by the Formulas (I), (II), (III), (IV) or (V), wherein one to three $R_1$ groups can be comprised on the ring.

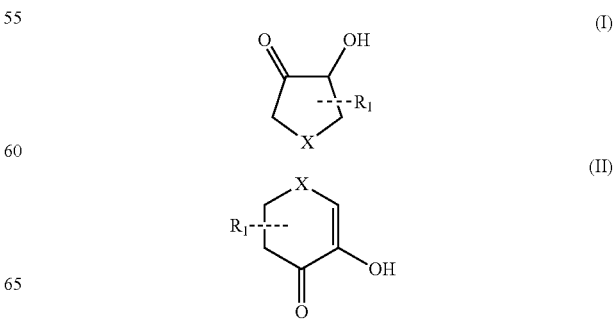

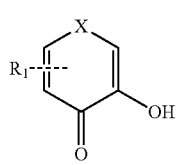
(III)

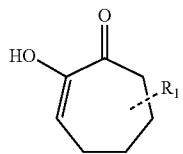
(IV)

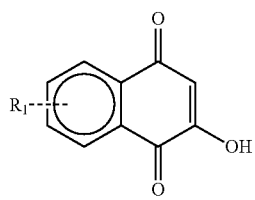
(V)

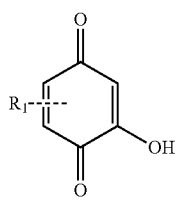
(VI)

with X=NH, O, S

R$_1$=C1 to C12 alkyl; cyclic 5- or 6-membered ring alkyl groups; OH-substituted alkyl groups, alkyl groups with ether, ester, amide, carboxyl groups; aryl groups or hydrogen.

Exemplary suitable aliphatic compounds are hydroxyl ketones that possess at least one OH group in the α-position. Vinylic forms of 1,2-diketones are also particularly suitable. Cyclic hydroxy ketones are particularly suitable. Such compounds can also possess one or more substituents. Cyclic or linear alkyl groups are preferred as the substituents R$_1$, they can also form aromatic rings. Similarly, the R$_1$ groups can possess additional substituents, such as unsaturated groups, additional OH groups, carboxyl groups, ester or amide groups or ether groups. A plurality of hydroxy keto structures can also be linked together through R$_1$. For example, hydroxy-4-pyrones, furanones, thiofuranones, 1-alkylpyrroles, benzoquinones, naphthoquinones, pyranones, hydropyridinones or corresponding 7-membered ring ketone structures can be selected. Examples of these are 2,5-dimethyl-4-hydroxy-furanone, 2-hydroxyethyl-4-hydroxy-furanone, 2-hydroxy-1,4-naphthoquinone, maltol, ethyl-maltol, kojic acid, α-tropolone, 5-alkyl-tropolone, 5-hydroxyalkyl-tropolone, β-thujaplicine, flavonol, morine, fisetine or corresponding structures.

Preferred suitable cyclic α-hydroxy ketones with 5-, 6- or 7-membered ring structures possess an additional hydroxyalkyl group, for example a CH$_2$—OH, C$_2$H$_4$—OH or a C$_3$H$_6$—OH group, in particular as illustrated in Formula (VII).

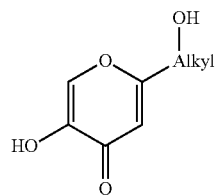
(VII)

Another embodiment of the invention employs triphenols with three neighboring OH groups as the retarding substance. In this regard, they concern compounds of the general Formula

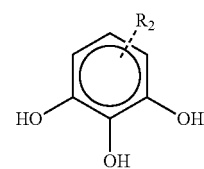
(VIII)

R$_2$=H; C1 to C12 alkyl groups; cyclic 5- or 6-membered ring alkyl groups; those with amino, ether, carboxyl, ester, amid groups; OH-substituted alkyl groups; or aromatic 6-membered rings. In particular, —OH, —COOH or -ester substituents are suitable. Examples of these are gallic acid, gallic acid esters with C1, C2, C3 to C12 alcohols, tannin, pyrogallol, 5-alkyl-pyrogallol or compounds that possess a plurality of such triphenol substituents. 1-R$_2$-3,4,5-OH phenol derivatives are particularly suitable, wherein R$_2$ should mean alkyl groups or cycloalkyl groups substituted with oxygen-containing functional groups.

The retarding substances can also comprise a plurality of functional groups of the same kind. However, the overall molecular weight should be less than 500 g/mol. The amount is selected such that a composition according to the invention comprises up to 10 wt % of the α-hydroxy ketones and/or triphenols, particularly 0.001 to 5 wt %. In this regard, based on the metal atom, 0.25 to 4 moles of a retarding compound should be comprised, either singly or also as a mixture. The amount can be selected such that the reaction rate is matched to the requirements of the application.

Independently of any theory, it is assumed that the retarding compounds form a complex with the metal atom which then shows the desired catalytic effect.

A subject matter of the invention is a catalyst composition of at least one of the above cited metal compounds and the retarding compound, such as the α-hydroxy ketone and/or the optionally substituted triphenol. In this regard, the substances can be selected such that the catalyst mixture is colorless. The catalyst composition itself can be liquid, however it is also possible for it to be dissolved or dispersed in non-reactive solvents, oils or plasticizers. As only minor amounts of the catalyst mixture are employed in a crosslinkable composition, an added amount of solvent is therefore not significant. Another embodiment employs the catalyst composition on a solid carrier material, for example inert powdered polymer or high surface area inorganic powder. In this regard, the retarding compound is then also bound to the surface of the carrier material. Another embodiment chemically bonds the retarding substance onto a polymeric backbone, and then adds a suitable metal compound to this reaction product. The catalyst mixture according to the invention comprises a retarding substance. In order to obtain the desired catalyst properties, in one embodiment it is required that no additional catalytically active compounds are comprised. For example, no additional amino or tertiary amino compounds should be comprised.

Particular embodiments of the invention employ catalyst mixtures that comprise Sn or Bi as the metal atom. Other embodiments employ retarding compounds that in particular comprise neither sulfur atoms nor nitrogen atoms and no thio groups. Another preferred embodiment employs retarding compounds that in addition to the complexing group possess still another functional group in particular in the group $R_1$ or $R_2$, for example OH, ester or carboxyl groups.

These catalyst compositions can be employed for the catalysis of 1 or 2 component systems. They are particularly suitable for compositions that can crosslink through an NCO—OH reaction or a silane condensation.

The compositions according to the invention concern crosslinking 1K- or 2K-compositions. They comprise one or more polymers that contain reactive groups, for example isocyanate groups or hydrolysable silane groups. In addition to the polymers, further components can be comprised, for example resins, plasticizers, adhesion promoters, reactive diluents, solvents, pigments or fillers, as already listed above. Optionally, it is possible for the compositions to comprise known cocatalysts, for example tertiary amines, such as DABCO, DBU, DBN or polymeric amines.

In the case of 1K-systems they can concern polymers that possess NCO groups. If the composition is deposited it is subsequently exposed to the humidity of the air. These NCO systems crosslink in the presence of humidity on the substrate and with ambient humidity. The crosslinking is accelerated by catalysts according to the present invention.

Another embodiment employs polymers as the 1K-system which can crosslink through alkoxysilane groups. If the composition is deposited it is subsequently exposed to the humidity of the air. These systems crosslink in the presence of humidity on the substrate and with ambient humidity. The crosslinking can likewise be accelerated by catalysts according to the present invention.

A particularly preferred embodiment employs 2K-coating systems. Here, one component can be an NCO-containing component. This can be monomeric or oligomeric isocyanates, but it is also possible for the above cited NCO-containing PU prepolymers to be employed. The additional component should comprise polymers that carry groups that can react with the NCO groups of the first component. After mixing, both components usually react spontaneously. This reaction can be accelerated by the catalysts according to the invention. It is preferred if the catalyst composition is blended in the OH-component.

2K-Compositions can also be employed together with the catalyst mixtures according to the invention, which consist of the above described 1K-NCO— or silane-systems. The second component can then comprise usual compatible, inert polymers and additives, but additionally comprises an amount of water that is sufficient for the crosslinking. A mixture of both of the components then likewise affords a crosslinking composition.

In the embodiment for crosslinking NCO-reactive systems, it is possible for the cyclic α-hydroxy ketone or the optionally substituted triphenol to be built into the crosslinked compound in the course of the crosslinking reaction. The functional groups can also react with the NCO groups. This leads to crosslinked compounds that comprise a permanently built in complex-forming ligand. This also enables a reduced migration of the metal catalyst to be achieved.

The compositions according to the invention can be employed as an adhesive, sealant, potting compound or coating agent. In this regard, coating agents are usually in a low viscosity state, such that they can be easily applied onto a substrate surface and spread out. In the embodiment as a sealant, higher viscosity compositions are usually selected which themselves are often non-flowing. They can have thixotropic properties, i.e. after application a flow limit is quickly formed, such that the applied compounds no longer flow or slide. In the embodiment as an adhesive, free-flowing and thixotropic adhesives are known. Embodiments are also possible which comprise neither solvent nor plasticizer.

The compositions according to the invention comprise a catalyst of metal atoms and retarding compounds. Mixing the catalyst with the 2K-composition does not impair the storage stability in the anhydrous state or when the components are separate. The crosslinking reaction begins when the 1K- or preferably 2K-compositions are mixed or applied. In this regard, the initial reaction induced by the catalyst composition is retarded, i.e. after the components are mixed only a slow reaction occurs in the first minutes. This period is called the induction period. At the end of the induction period the catalytic activity of the catalyst mixture according to the invention increases in the crosslinking systems. The crosslinking reaction is significantly accelerated, as is demonstrated for example by a rise in viscosity or by a rapid increase of crosslinking.

The catalyst compositions according to the invention can be prepared separately. They are storage-stable and in the crosslinkable compositions do not lead to a premature reaction of the ingredients. The crosslinkable compositions comprising the suitable catalyst mixtures, after processing on the substrates, afford materials that immediately after application or after the adhesive bonding can be modified in their relative position and improved. However, at the end of the induction period there follows a rapid crosslinking reaction. This means that the adhesively bonded substrates can be further processed shortly after their combination, without the adhesive bond being impaired.

The invention is illustrated in more detail by means of the following examples.

EXAMPLE 1

A liquid polyol mixture of trimethylolpropane (ca. 3.8%) and a polyester polyol of adipic acid/neopentyl glycol (M ca. 530 g/mol, hydroxyl no.=210) was produced with a total hydroxyl number of 250 mg KOH/g FK. To this were mixed 0.01% DOTL (tin catalyst) (component 1).

This polyol component was mixed 1:1 by weight with Desmodur N 3300 (HDI isocyanurate) at 40° C.

The reaction was then determined at 40° C. by viscosity measurements (Brookfield RVDT-II, according to EN ISO 2555). Test series were carried out with:

V1: as described (comparative)

V2: +0.1% DOTL (comparative)

V3: V2+0.1% kojic acid

V4: V2+0.25% kojic acid

V5: V2+0.15% gallic acid

V6: V2+0.3% 8-OH-quinoline (comparative experiment)

Viscosity table

| Viscosity mPas | V1 | V2 comp. | V3 | V4 | V5 | V6 comp. |
|---|---|---|---|---|---|---|
| 2 min |  | 4000 |  |  |  |  |
| 4 min |  | 9000 | <2000 | <2000 | <2000 | <2000 |
| 8 min |  | 90000 | <2000 | <2000 | <2000 | <2000 |
| 20 min |  | not measurable | <2000 | <2000 | <2000 | <2000 |
| 40 min | 8000 |  | 2000 | 2000 | <2000 | 2000 |
| 60 min | 17000 |  | 3000 | 2500 | <2000 | 3000 |
| 80 min | 40000 |  | 4000 | 3000 | 2000 | 4000 |
| 100 min | 90000 |  | 6000 | 4000 | 3000 | 9000 |
| NCO value |  |  |  |  |  |  |
| 72 h | 2.1 |  |  | 1.6 |  | 2.5 |
| 96 h | 2.4 |  | 0 | 0 |  | 1.9 |
| 168 h | 0 |  |  |  |  |  |

The complete crosslinking was determined IR spectroscopically by the NCO groups. (Peak height over base line)

The tests according to the invention initially show a slower reaction, but a faster complete crosslinking.

Films were adhesively bonded with the adhesive V1 (comparative) and with V4. The adhesively bonded samples were stored at 25° C. in a normal environment.
Structure 1: PET 12 μm/PE 70 μm
Structure 2: PET 12 μm/CPP 50 μm
Coating weight 2 g/m², storage/curing at 25° C.
The time was determined before a structural tear was observed.

| | |
|---|---|
| S1/V1 | 4 d, 3.5N/15 mm (comparative) |
| S1/V4 | 3 d, 3.4, N/15 mm |
| S2/V1 | 7 d, 3.5N/15 mm (comparative) |
| S2/V4 | 4 d, 3.4N/15 mm |

The adhesive bonds according to the invention show a more rapid cure with a longer processing time.

A laminate of 12 μm PET and 70 μm CPP was produced from V4 and V6 with a coating weight of 2 g/m² and cured for 14 days at 25° C. Pouches, 14.4×14.4 cm, were produced, filled with 100 ml water or with 3% acetic acid, and closed by sealing. The samples were then heated in an autoclave for 30 minutes at 121° C. and the contents (water, acetic acid) were tested for catalyst components. Sn and kojic acid from V4 were not found above the detection limit. In the comparative test V6, 8-hydroxyquinoline was determined in both solutions.

EXAMPLE 2

A polyol component was produced from castor oil (50%) and chalk (50%). To this were mixed 0.02% DOTL (tin catalyst).

This component was mixed with crude MDI in the ratio 4:1.

The initial viscosity was 1500 mPas (25° C.). The time was determined to reach 100000 mPas.

V7 without retarding substance: 17 min (comparative)
V8 with additional 0.05% kojic acid: 102 min The composition according to the invention showed a retarding effect even for such potting compounds.

EXAMPLE 3

A prepolymer was produced from PPG 400 and PPG 1000 (1:1) and 4,4-MDI which comprised a residual NCO content of 13%.

To this was added a second component that was a polymer mixture 10/10/80 of polyether polyols PPG diol (1000)/PPG triol (450)/PPG triol (1000). (NCO:OH=1.4:1)

The catalyst (DOTL, tin catalyst) was optionally mixed into the polyol component together with the retarding substance.

The reaction was then determined at 40° C. by viscosity measurements.

Test series were carried out with:
V9: example 3 without catalyst (comparative)
V 10: V9+0.1% DOTL (comparative)
V 11: V9+0.25% tannin
V 12: V9+0.1% kojic acid
V 13: V9+0.25% kojic acid
V 14: V9+0.5% gallic acid
V 15: V9+0.5% catechol (comparative)
V16: V9+0.5% 3,4-hydroxycinnamic acid (comparative)

Viscosity table

| Viscosity mPas | V9 comp. | V10 comp. | V11 | V12 | V13 | V14 | V15 comp. | V16 comp. |
|---|---|---|---|---|---|---|---|---|
| 2 min | 2000 | 2000 | 2000 | 2000 | 2000 | 2000 | 2000 | 2000 |
| 4 min | 2000 | 2500 | 2000 | 2000 | 2000 | 2000 | 2800 | 2500 |
| 8 min | 2000 | 4000 | 2000 | 2000 | 2000 | 2000 | 3500 | 3000 |
| 16 min | 2000 | 9500 | 2200 | 2100 | 2000 | 2000 | 7500 | 6000 |
| 20 min | 2100 | 17000 | 2400 | 2400 | 2100 | 2000 | 10000 | 8000 |
| 30 min | 2800 | 49000 | 3000 | 4000 | 3000 | 2300 | >50000 | 20000 |
| 40 min | 4000 | >50000 | 6000 | 7500 | 4500 | 5000 |  | >50000 |
| 60 min | 6500 |  | 10000 | 12000 | 8000 | 8000 |  |  |

The reaction rate, measured as the rise in viscosity, showed a delayed reaction even for crosslinking through aromatic isocyanates.

What is claimed is:
1. A two component crosslinkable composition comprising:
 a first part including reactive polymers selected from (i) prepolymers that possess reactive NCO groups or (ii) polymers that possess reactive silane groups; and
 optional additives; and
 a second part including at least one metal-based catalyst; up to 10 wt % of a retarding substance selected from

5, 6 or 7 membered ring structures comprising a keto group bound to a ring atom of the ring structure and a hydroxy group bound to an adjacent ring atom and further comprising a substituent selected from: H; C1 to C12 alkyl groups; cyclic 5- or 6-membered ring alkyl groups; OH-substituted alkyl groups; alkyl groups with amino, ether, carboxyl, ester or amide groups; or aryl groups; and/or triphenols containing three neighboring OH groups, and further comprising a substituent selected from: —OH; —COOH; -ester; C1 to C12 alkyl groups; cyclic 5- or 6-membered ring alkyl groups; cyclic 5- or 6-membered ring alkyl groups with amino, ether, carboxyl, ester or amide groups; OH-substituted alkyl groups; or aromatic 6-membered rings; and optional additives.

2. The composition according to claim 1, wherein the catalyst is selected from Mn, Fe, Co, Ni, Ti, V, Zr, Sn, Pb or Bi compounds.

3. The composition according to claim 1, wherein the retarding substance is an 1-alkyl substituted 2,3,4- or 3,4,5—OH triphenol.

4. The composition according to claim 1, wherein the retarding substance is present in amounts of 0.25 to 4 mole per mole of the metal based catalyst.

5. The composition according to claim 1, wherein the retarding substance possesses at least one COOH or ester group.

6. The composition according to claim 1, wherein the retarding substance has a molar mass of less than 500 g/mol or is fixed on a solid carrier.

7. The composition according to claim 1, being a two component polyurethane composition wherein the first part includes (i) prepolymers that possess reactive NCO groups and the second part includes an NCO reactive component, the metal based catalyst and the retarding substance.

8. Cured reaction products of the composition according to claim 7, wherein the retarding substance after the crosslinking of the composition is chemically bound into the network of the polyurethane reaction products.

9. The composition according to claim 1, wherein the reactive polymers are (ii) polymers that possess reactive silane groups.

10. A two component crosslinkable composition comprising:
    a first part including reactive polymers selected from (i) prepolymers that possess reactive NCO groups or (ii) polymers that possess reactive silane groups, and optional additives; and
    a second part including at least one metal-based catalyst, up to 10 wt % of a retarding substance, and optional additives;
    wherein the retarding substance compound is selected from at least one of:
        at least one of formulas (I), (II), (III), (IV), (V) or (VI), wherein one to three Ri groups can be comprised on the ring,

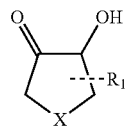
(I)

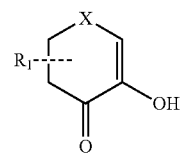
(II)

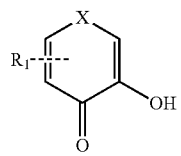
(III)

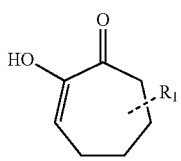
(IV)

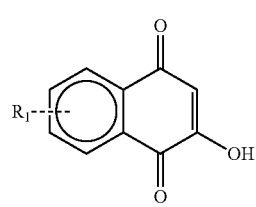
(V)

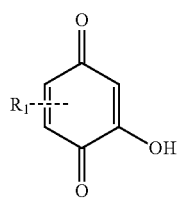
(VI)

wherein X is NH, O or S,
each Ri is independently selected from C1 to C12 alkyl; cyclic 5- or 6-membered ring alkyl groups; OH-substituted alkyl groups, alkyl groups with one or more ether, ester, amide, carboxyl groups; aryl groups or hydrogen; and
compounds of general Formula (VII)

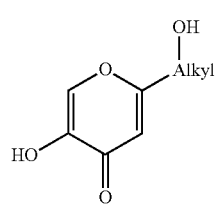
(VII)

wherein Alkyl is a C1 to C3 group; and
compounds of general Formula (VIII)

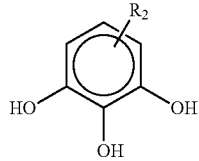

(VIII)

wherein $R_2$ is selected from OH; COOH; ester; C1 to C12 alkyl groups; cyclic 5- or 6-membered ring alkyl groups; cyclic 5- or 6-membered ring alkyl groups with amino, ether, carboxyl, ester or amide groups; OH-substituted alkyl groups; or aromatic 6-membered rings.

11. The composition according to claim 10, wherein the retarding substance compound is selected from Formulas (I), (II), (III), (IV), (V) or (VI), wherein one to three $R_1$ groups can be comprised on the ring,

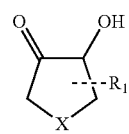

(I)

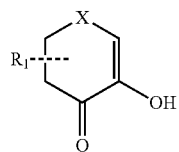

(II)

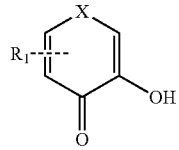

(III)

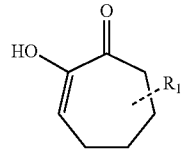

(IV)

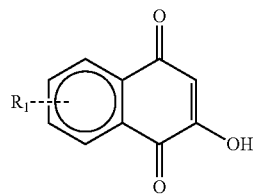

(V)

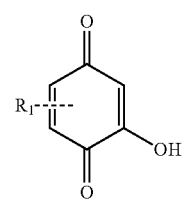

(VI)

wherein X is NH, O or S, each $R_1$ is independently selected from C1 to C12 alkyl; cyclic 5- or 6-membered ring alkyl groups; OH-substituted alkyl groups, alkyl groups with one or more ether, ester, amide, carboxyl groups; aryl groups or hydrogen.

12. The composition according to claim 10, wherein the retarding substance is selected from compounds of the general Formula (VIII)

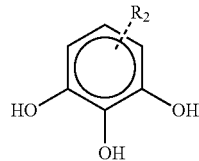

(VIII)

wherein $R_2$ is selected from OH; C1 to C12 alkyl groups; cyclic 5- or 6-membered ring alkyl groups; cyclic 5- or 6-membered ring alkyl groups with amino, ether, carboxyl, ester or amide groups; OH-substituted alkyl groups; or aromatic 6-membered rings.

* * * * *